United States Patent [19]

Colardelle et al.

[11] 4,037,120
[45] July 19, 1977

[54] ELECTRONIC DIPOLE FOR LOOPING A TELEPHONE LINE

[75] Inventors: Joel Serge Colardelle, Creteil; Marie Helene Comte, Jouy-en-Josas; Claude Paul Henri Lerouge, Maurepas, all of France

[73] Assignee: International Standard Electric Corporation, New York, N.Y.

[21] Appl. No.: 682,763

[22] Filed: May 3, 1976

[30] Foreign Application Priority Data

June 27, 1975 France .............................. 75.20202

[51] Int. Cl.² .......................................... H03K 17/00
[52] U.S. Cl. .................................. 307/311; 307/254; 307/297; 179/16 AA
[58] Field of Search ............... 307/311, 296, 297, 251, 307/254; 250/551, 552; 519/16 AA, 18 FA

[56] References Cited

U.S. PATENT DOCUMENTS

| 3,576,452 | 4/1971 | Smith | 307/311 |
| 3,942,046 | 3/1976 | Limberg | 307/297 |

Primary Examiner—Stanley D. Miller, Jr.
Assistant Examiner—B. P. Davis
Attorney, Agent, or Firm—James B. Raden; William J. Michals

[57] ABSTRACT

An electronic dipole circuit operating at constant current, designed to be used for looping a telephone line from a private branch exchange is disclosed. The circuit comprises a first transistor with the current which is constant in the emitter circuit owing to the presence of a second transistor. A device connected between the collector and the base of the first transistor delivers a constant current. Such a device may comprise, for example, a phototransistor or a field-effect transistor placed in series with a phototransistor.

2 Claims, 5 Drawing Figures

ELECTRONIC DIPOLE FOR LOOPING A TELEPHONE LINE

BACKGROUND OF THE INVENTION

This invention relates to an electronic dipole used as looping element of a telephone line, and applies more especially to a private branch exchange.

A private branch exchange allows more particularly to connect a certain number of subscribers to a central office by means of one or more telephone lines supplied from the central office. The private branch exchange calls or receives a call coming from the central office by looping the line, this operation causing the flow of a direct current. A dialed number is sent from the private branch exchange to the central office by repeated looping and breaking of the line. The looping element, placed in parallel between the two wires of the line, must therefore present on the one hand a low impedance to the d-c supply current, and on the other hand the highest possible impedance to alternating current, in order to permit the transmission of speech signals.

This looping element can be designed in the usual way with an inductance placed in the circuit by means of a relay. This device has the disadvantage of being bulky and heavy, and introduces delays and distortion during looping.

Completely electronic looping elements are also known. Such an element is described in the French patent application No. 73 40850 filed by the applicant on Nov. 16, 1973, and entitled "Electronic Trunk Junctor". This element is an electronic dipole operating at constant current, the current being fixed at a value higher than the detection threshold of the loop state detector located in the central office. Variations in the resistance of the telephone line, due mainly to its length, can be overcome by the operation at constant current for the dipole. However, the constant current operation characteristic is obtained only when a relatively high voltage (about 10 V) is present at the terminals of the dipole.

The object of this invention precisely is an electronic dipole for looping a telephone line operating at constant current even when a low voltage is applied to its terminals.

The dipole according to the invention, including a first transistor whose collector is connected directly to a first terminal of the line and whose emitter is connected to a second terminal of the line through a resistor, and a second transistor whose collector and base are connected respectively to the base and emitter of the first transistor and whose emitter is connected to the second terminal of the line, and wherein a circuit through which a constant current flows, is coupled between the collector and the base of the first transistor.

BRIEF DESCRIPTION OF THE DRAWING:

Other characteristics and advantages of this invention will be brought out in the following description of embodiments, the said description corresponding to the attached drawings in which.

DETAILED DESCRIPTION

Figure 1:
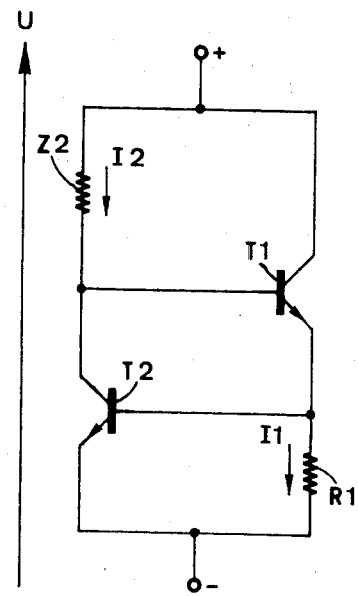
FIG. 1 shows the principal diagram of the dipole according to the invention.

FIG. 1 is the principal diagram of the electronic dipole according to the invention. This dipole, supplied by means of a "+" terminal and a "−" terminal, includes a transistor T1 whose collector is directly connected to the + terminal and whose emitter is connected to the − terminal through a resistor R1. The base of transistor T1 is supplied by the + terminal through an impedance Z2. A second transistor T2, placed between the base of transistor T1 and the − terminal, and whose base is connected to the emitter of transistor T1, is used to regulate the current flowing through resistor R1. We shall call I1 the current flowing through R1, I2 the current flowing through Z2, Vbe the conduction threshold of transistors T1 and T2, B the current gain of transistor T1, and U the d-c voltage applied to the terminals of the dipole. The desired result is a constant current in the dipole, regardless of the value of the applied voltage U, but this result is to be obtained with the smallest possible voltages U. The dipole will thus act as a very high impedance with respect to the alternating current applied to its terminals.

When the voltage U applied to the terminal of the dipole is very low, transistor T2 is cut off. We can then write:

$$U = Z2 \cdot I2 + Vbe + R1 \cdot I1$$

or $$U = Z2 \cdot \frac{I1}{B} + Vbe + R1 \cdot I1 \tag{1}$$

Under these conditions, the current I1 increases virtually linearly as the voltage U increases.

Now if the voltage U is high enough for the conduction threshold of transistor T2 to be reached, a voltage Vbe will appear at the terminals of resistor R1 and the current I1 will thus be maintained constant. We have:

$$I1 = \frac{Vbe}{R1} \tag{2}$$

When the voltage U is just sufficient for the conduction threshold of transistor T2 to be reached, and therefore for current I1 to be constant, equation(1) becomes:

$$U = Z2 \cdot \frac{I1}{B} + 2\, Vbe \tag{3}$$

We shall call this voltage U'. From equations (2) and (3), we obtain:

$$U' = Z \cdot \frac{Vbe}{B.R1} + 2\, Vbe \tag{4}$$

In equation (4), terms Vbe and B are given and the value R1 is determined by the desired value of the constant current I1. Since we desire to obtain the smallest possible voltage U', in order to obtain a constant value of current I1 as quickly as possible, the value of Z2 must be small.

In order for the dipole current to be strictly constant, not only must the current I1 be constant, but also the current I2 flowing through impedance Z2 and transistor T2. With respect to alternating current, the value of Z2 must be as large as possible.

Figure 2:
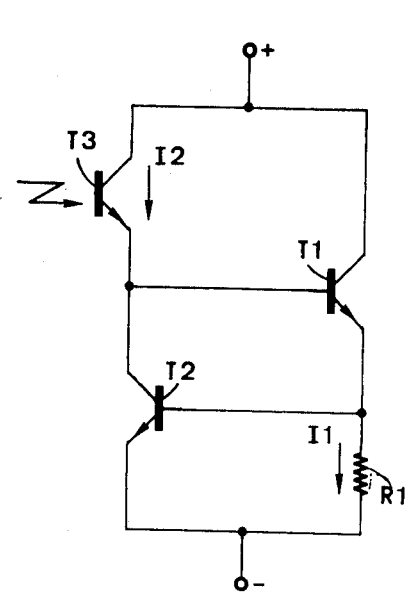
FIGS. 2, 3 and 5 show embodiments of the dipole according to the invention; and, FIG. 4 shows the current-voltage curves of the dipoles in FIGS. 3 and 5.

FIG. 2 shows an example of the electronic dipole according to the invention, satisfying the above-determined conditions. We again find the elements T1, T2 and R1 of FIG. 1. The impedance Z2 is obtained by a phototransistor T3 optically coupled to an electroluminescent control diode (not shown). The telephone line across terminals of which the dipole is placed is released by the cut-off of phototransistor T3 controlled by the electroluminescent diode. Placing the dipole in the circuit, therefore looping the line, is obtained by the conduction of phototransistor T3. As soon as voltage across the the terminals of T3 virtually attains the value Vbe, its characteristic curve I2 = f(Vce) is horizontal (Vce is the voltage applied between the collector and the emitter) and consequently current I2 is constant. Thus, a constant current flows in the dipole as soon as the voltage U at its terminals reaches virtually 3 Vbe, and the dipole then presents a high impedance with respect to alternating current.

Figure 3:
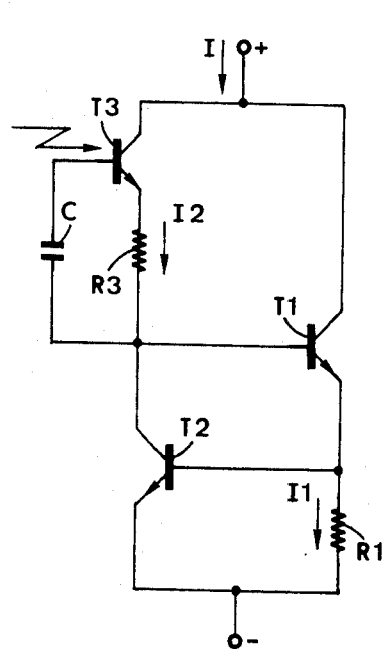
Figure 4:
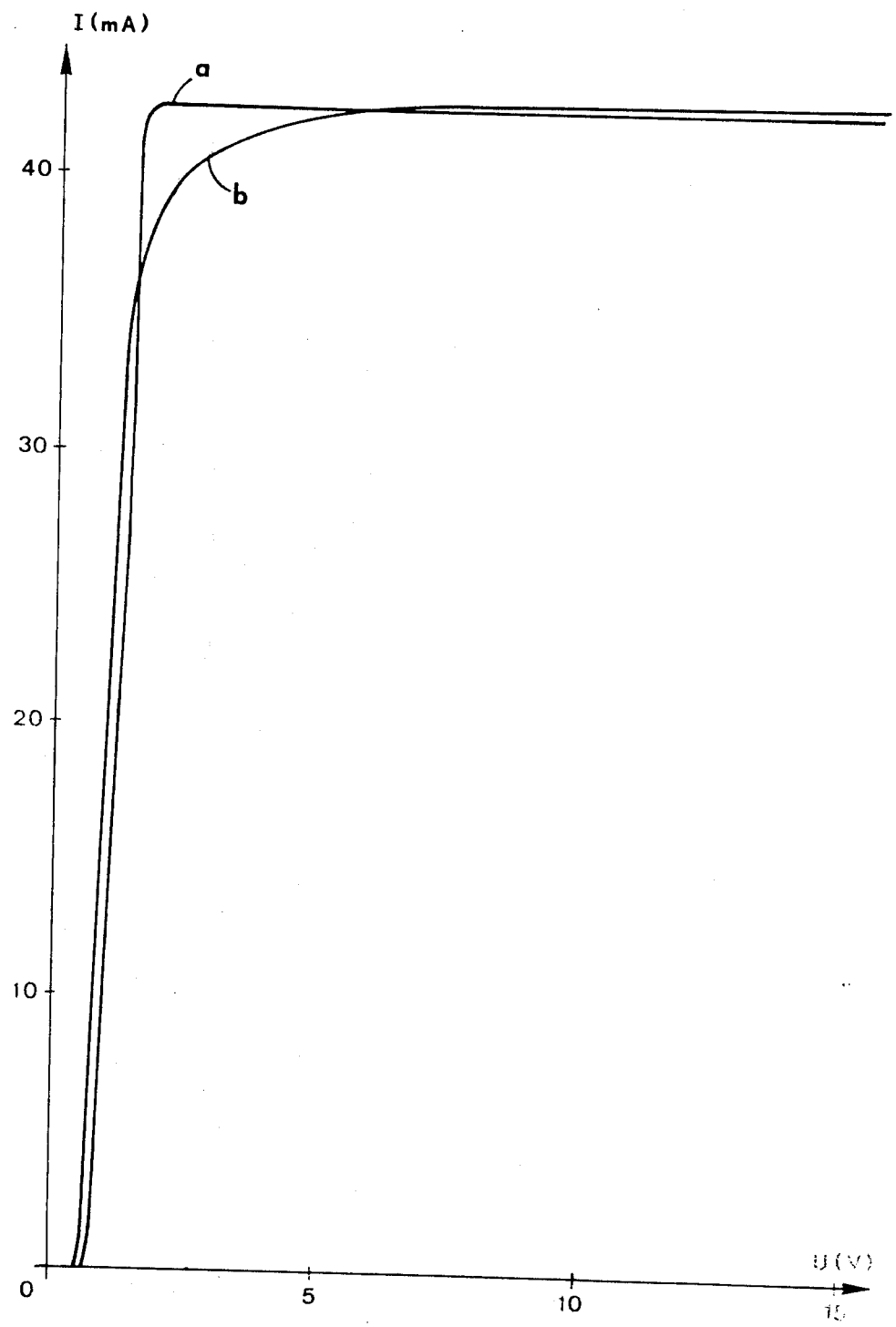

FIG. 3 shows an improved variant of the dipole of FIG. 2. Again we find the elements T1, T2, T3 and R1 of FIG. 2, but this time a resistor R3 is placed between the emitter of the phototransistor T3 and the base of transistor T1, and a capacitor C is placed between the base of phototransistor T3 and the base of transistor T1. We can consider that the dipole formed by the phototransistor T3, capacitor C and resistor R3 is a gyrator circuit and consequently presents a high impedance with respect to alternating current. The operating principle of the gyrator circuit was reviewed in the above-mentioned French patent application. Curve $a$ of FIG. 4 shows an example of the current I flowing through the dipole of FIG. 3 as a function of the voltage U which is applied to it, with the following numerical values being assumed:

$C = 0.1 \mu F$
$R1 = 16 \Omega$
$R3 = 100 \Omega.$

Figure 5:
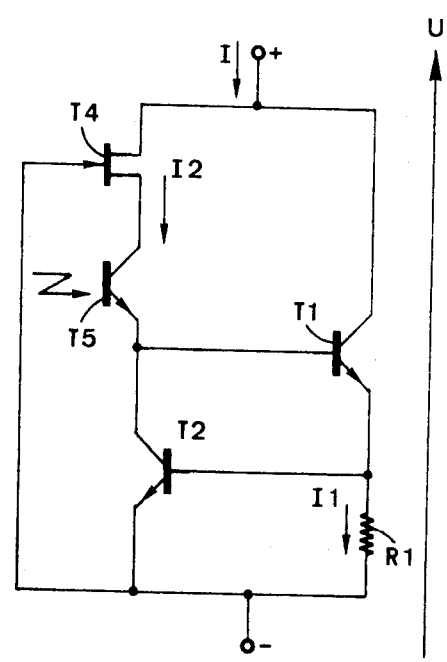

FIG. 5 is another variant of the electronic dipole according to the invention. We again find the elements T1, T2 and R1. A field-effect transistor T4 is placed in series with a phototransistor T5 between the + terminal of the dipole and the base of transistor T1. The gate of the field-effect transistor T4 is connected to the − terminal of the dipole. The dipole is placed in the circuit by the conduction of the phototransistor T5. The gate voltage of the field-effect transistor T4 is constant and as soon as the drain source voltage reaches the pinch-off voltage, the characteristic curve I2 = f(Vds) is virtually horizontal (Vds = voltage applied between drain and source). Curve $b$ of FIG. 4 shows the current I flowing through the dipole of FIG. 5 as a function of the voltage U which is applied to it, for the same value R1 as in the case of curve $a$. The bend of curve $b$ is less clean than in curve $a$ and the horizontal characteristic is obtained only starting at 5 to 6 V. This is due to the fact that the pinch-off voltage of the field-effect transistor is on the order of 5 V.

Although this invention has been described in connection with several particular embodiments, it is clearly not limited to the said embodiments and is capable of other variants or modifications still falling within its scope.

What is claimed is:

1. An electronic dipole for the looping of a telephone line, operating at constant current even for low voltages applied to its terminals, including a first transistor whose collector is connected directly to a first terminal of the line and whose emitter is connected to the second terminal of the line through a resistor, and a second transistor whose collector and base are connected respectively to the base and emitter of the first transistor and whose emitter is connected to the second terminal of the line, and wherein a circuit through which a constant current flows is coupled between the collector and the base of the first transistor, wherein the said circuit allowing a constant current to flow consists of a phototransistor having an emitter, a base and a collector electrode and controlled by electroluminescent diode, and wherein a resistor is placed between the emitter of the phototransistor and the base of the first transistor, and wherein a capacitor is placed between the base of the phototransistor and the base of the first transistor.

2. An electronic dipole for the looping of a telephone line, operating at constant current even for low voltages applied to its terminals, including a first transistor whose collector is connected directly to a first terminal of the line and whose emitter is connected to the second terminal of the line through a resistor, and a second transistor whose collector and base are connected respectively to the base and emitter of the first transistor and whose emitter is connected to the second terminal of the line, and wherein a circuit through which a constant current flows is coupled between the collector and the base of the first transistor, wherein the said circuit allowing a constant current to flow consists of a field-effect transistor having first and second main electrodes and a gate electrode said main electrodes being placed in series with a phototransistor which is controlled by an electroluminescent diode, with said gate electrode of said field-effect transistor connected to the second terminal of the line.

* * * * *